United States Patent
Mattingly et al.

(10) Patent No.: US 10,446,149 B2
(45) Date of Patent: Oct. 15, 2019

(54) SYSTEMS AND METHODS TO COMMUNICATE WITH PERSONS OF INTEREST

(71) Applicant: Walmart Apollo, LLC, Bentonville, AR (US)

(72) Inventors: Todd D. Mattingly, Bentonville, AR (US); Bruce W. Wilkinson, Rogers, AR (US); Donald R. High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 82 days.

(21) Appl. No.: 15/726,134

(22) Filed: Oct. 5, 2017

(65) Prior Publication Data

US 2018/0102128 A1 Apr. 12, 2018

Related U.S. Application Data

(60) Provisional application No. 62/404,970, filed on Oct. 6, 2016.

(51) Int. Cl.
*G06Q 10/08* (2012.01)
*H04W 4/00* (2018.01)
(Continued)

(52) U.S. Cl.
CPC ............ *G10L 15/22* (2013.01); *G05D 1/0088* (2013.01); *G05D 1/0276* (2013.01);
(Continued)

(58) Field of Classification Search
CPC .................................. G06Q 10/00; H04W 4/00
See application file for complete search history.

(56) References Cited

U.S. PATENT DOCUMENTS 7,095,336 B2 8/2006 Rodgers
8,253,589 B2 8/2012 Grimm
(Continued)

FOREIGN PATENT DOCUMENTS

WO 2016090414 6/2016

OTHER PUBLICATIONS

Anaya, Jose Javier, et al.; "Vehicle to Pedestrian Communications for Protection of Vulnerable road Users", 2014 IEEE Intelligent Vehicles Symposium, Jun. 2014, Dearborn, Michigan, https://hal.archives-ouvertes.fr/hal-00992759/document, pp. 1-7.
(Continued)

*Primary Examiner* — Shreyans A Patel
(74) *Attorney, Agent, or Firm* — Fitch, Even, Tabin & Flannery LLP

(57) ABSTRACT

In some embodiments, systems and methods are provided herein useful to communicate with a person of interest ("PoI") via an autonomous ground vehicle ("AGV") on a product delivery route. In some embodiments, autonomous product delivery systems are provided to enable communications with a PoI, comprises: an AGV on a product delivery route that includes one or more control circuits, one or more sensors in electrical communication with the one or more control circuits and configured to communicate sensor data to the one or more control circuits, and one or more emitters in electrical communication with the one or more control circuits. The control circuit uses sensor data to detect the presence of PoIs when they are positioned within a threshold distance relative to the AGV on the product delivery route, and in response thereof, cause the emitters to transmit a personalized message to the detected PoIs.

20 Claims, 6 Drawing Sheets

(51) Int. Cl.
*G10L 15/22* (2006.01)
*G05D 1/00* (2006.01)
*G05D 1/02* (2006.01)
*G10L 13/04* (2013.01)

(52) U.S. Cl.
CPC ........ *G06Q 10/0832* (2013.01); *G10L 13/043* (2013.01); *G10L 2015/227* (2013.01)

(56) References Cited

U.S. PATENT DOCUMENTS

| | | |
|---|---|---|
| 8,537,030 B2 | 9/2013 | Perkins |
| 9,196,164 B1 | 11/2015 | Urmson |
| 9,550,577 B1 | 1/2017 | Beckman |
| 9,573,684 B2 | 2/2017 | Kimchi |
| 1,572,611 A1 | 10/2017 | Mattingly |
| 2011/0232584 A1 | 9/2011 | Valencia |
| 2014/0136414 A1 | 5/2014 | Abhyanker |
| 2015/0006005 A1 | 1/2015 | Yu |
| 2015/0120094 A1 | 4/2015 | Kimchi |
| 2015/0202770 A1 | 7/2015 | Patron |
| 2015/0277440 A1 | 10/2015 | Kimchi |
| 2016/0070260 A1* | 3/2016 | Levien .................... G05D 1/00 701/3 |
| 2016/0104098 A1* | 4/2016 | Matula ................ G06Q 10/083 701/23 |
| 2016/0196755 A1 | 7/2016 | Navot |
| 2016/0253624 A1* | 9/2016 | Sims ....................... H04W 4/80 705/333 |
| 2016/0257401 A1 | 9/2016 | Buchmueller |
| 2017/0110017 A1 | 4/2017 | Kimchi |

OTHER PUBLICATIONS

Little Black Book, "Domino's Rolls Out World's First Driverless Pizza Delivery Vehicles", https://lbbonline.com/news/dominos-rolls-out-worlds-first-driverless-pizza-delivery-vehicles/, accessed on May 31, 2016, pp. 1-8.
PCT; App. No. PCT/US2017/055237; International Search Report and Written Opinion dated Dec. 28, 2017.
PCT; App. No. PCT/US2017/055325; International Search Report and Written Opinion dated Dec. 7, 2017.

\* cited by examiner

SYSTEMS AND METHODS TO COMMUNICATE WITH PERSONS OF INTEREST

CROSS-REFERENCE TO RELATED APPLICATION

This application claims the benefit of U.S. Provisional Application No. 62/404,970 filed Oct. 6, 2016, which is incorporated herein by reference in its entirety.

TECHNICAL FIELD

This invention relates generally to communicating with persons of interest.

BACKGROUND

Humans and robots concurrently occupy the same environments on an increasing basis. Robots may appear intimidating and/or non-emotional, which may result in perception problems and/or feelings of discomfort for such humans. For example, humans may not be aware of the robot's destination and/or purpose, which can cause fear and/or tension. In addition, robot movements may seem unpredictable to humans and/or humans may be unsure how to anticipate robot movements in their environment.

BRIEF DESCRIPTION OF THE DRAWINGS

Disclosed herein are embodiments of systems, apparatuses and methods pertaining to enabling communication with persons of interest via autonomous ground vehicles. This description includes drawings, wherein.

Figure 1:
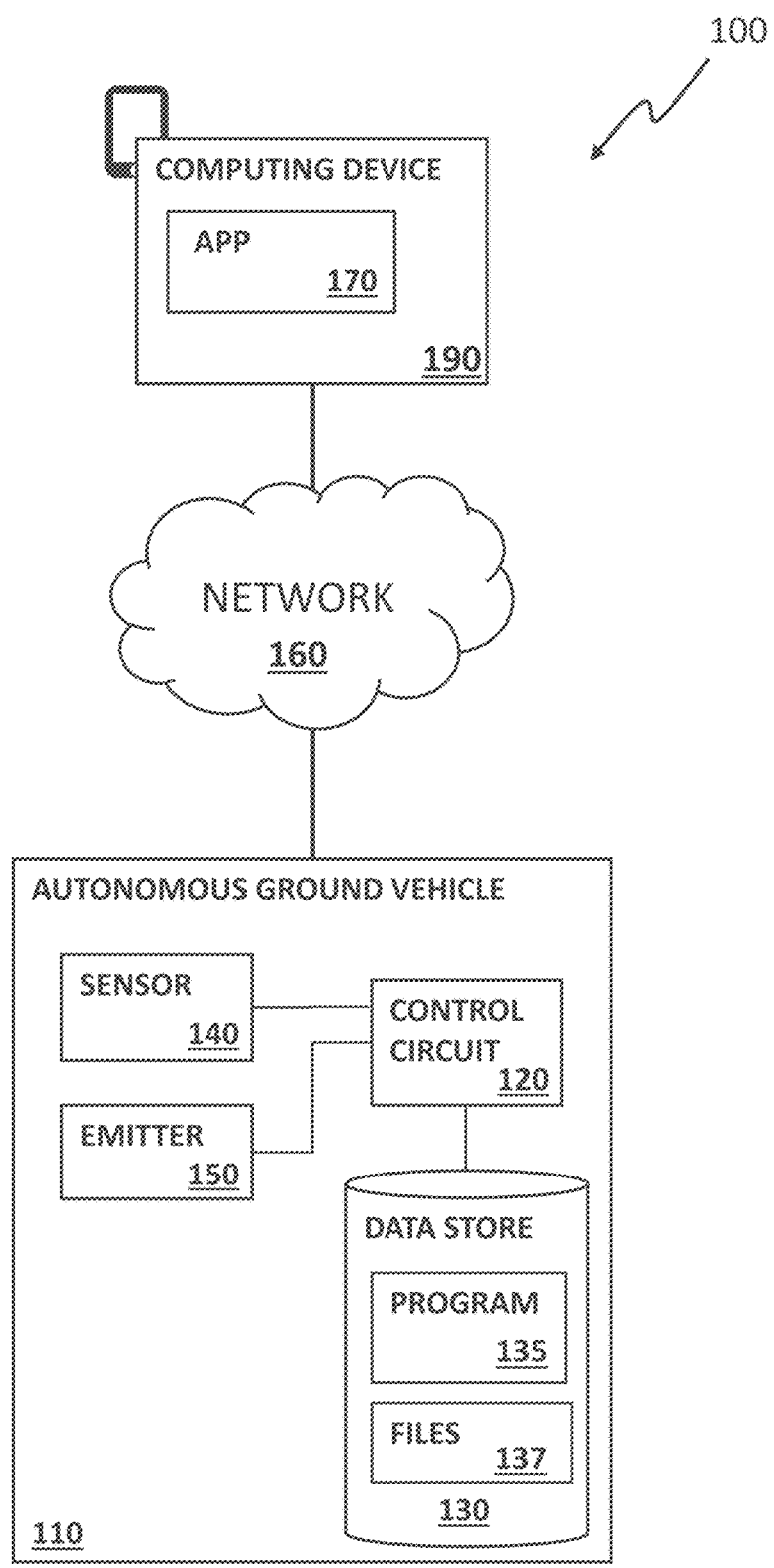
FIG. 1 illustrates a simplified block diagram of a system to enable communication with persons of interest ("PoIs") via autonomous ground vehicles ("AGVs"), in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems and methods are provided herein useful to enable communication with persons of interest ("PoIs") via autonomous ground vehicles ("AGVs"). In some embodiments, systems are provided to enable communication with a PoI, comprises: an AGV on a product delivery route that includes one or more control circuits, one or more sensors in electrical communication with the one or more control circuits and configured to communicate sensor data to the one or more control circuits, and one or more emitters in electrical communication with the one or more control circuits. The one or more control circuits use sensor data to detect the presence of one or more PoIs positioned within a threshold distance relative to the AGV. Some embodiments, in response to the detection, can cause the one or more emitters to transmit one or more personalized messages to the one or more PoIs.

In some embodiments, methods are provided for enabling communications with PoIs via AGVs. Some of these methods detect, through an AGV on a product delivery route, the presence of one or more PoIs positioned within a threshold distance relative to the AGV. One or more personalized messages may be transmitted from the AGV to the one or more PoIs. The personalized message may include information associated with and previously supplied by the PoIs, and/or be directed a PoI based on information provided by the PoI.

Humans and robots currently share an environment on an increasing basis. Robots may appear intimidating and/or non-emotional, which may result in perception problems and/or feelings of discomfort for such humans. For example, humans may not be aware of the robot's destination and/or may be aware of the robot's purpose, which can cause fear and/or tension. In addition, robot movements may seem unpredictable to humans and/or humans may be unsure how to anticipate robot movements in their environment.

FIG. 1 illustrates a simplified block diagram of a system 100 to enable communication with PoIs and delivery of commercial products, in accordance with some embodiments. The system, in some applications, includes one or more AGVs 110, and one or more computing devices 190 configured to communicate over a computer and/or one or more communication networks 160. Network 160 can be, for example, a local area network (LAN), a wide area network (WAN) such as the Internet, or a combination of the two, and includes wired, wireless, or fiber optic connections.

In general, network 160 can be any combination of connections and protocols that can support communications between computing device 190 and AGV 110, in accordance with some embodiments. Computing device 190 is a device that is associated with a PoI. For example, PoIs may be persons that can be identified by the AGVs 110, prior delivery recipients, customers having purchase histories associated with the AGVs 110 and/or similar commercial relationships. Computing device 190 can be a desktop computer, laptop computer, a thin client, a smart TV, an in-vehicle computing device, a wearable computing device, or a mobile device, including but not limited to, smart phones, phablets, and tablets. In general, computing device 190 can be any computing device that can execute software application ("APP") 170 and communicate with AGV 110, in accordance with some embodiments. Computing device 190 comprises app 170. Typically, computing device 190 includes one or more unique identifier codes that can be used to identify the computing device. In some instances, for example, the computing device 190 can have a universally administered or locally administered media access control ("MAC") address, unique device identifier, or similar unique identifying code. Similarly, a unique serial number or other code may be defined within the APP 170 that uniquely identifies the computing device.

The computing device 190, in some applications, is configured to communicate with the AGV 110. In part, the APP 170 can cause transmission of a unique identifier code, a computing device identifier, phone number, password, and/or other identifier information associated with computing device 190 and/or a user to the AGV 110. In certain embodiments, APP 170 is a mobile application (i.e. software designed to run on mobile computing devices). Additionally or alternatively, the APP 170 may cause transmission of geolocation data (such as latitude and longitude, GPS coordinates, Global Navigation Satellite Systems (GNSS) data, mapping information, address information, and/or other such location information) that reflects the present location of computing device 190 to AGV 110. In some applications, for example, the APP 170 can cause transmission of non-publically available information about the PoI that is stored on and/or accessible via computing device 190 to AGV 110. For example, non-publically available information can comprise user browser history, social media postings, contacts list entries, geographical identification metadata, other such information, or combination of two or more of such information. In certain embodiments, APP 170 can convey one or more notifications received from AGV 110 to PoIs. In some instances, the non-publically available information is derived from a non-publically available data source external to computing device 190 and/or AGV 110.

The AGV 110 is a vehicle configured to autonomously traverse one or more intended environments in accordance with one or more routes and/or determined paths, and typically without the intervention of a human, while delivering consumer products and/or to perform one or more tasks. In some instances, however, a remote operator may temporarily or permanently take over operation of the AGV 110 using feedback information from the AGV 110 (e.g., audio and/or video content, sensor information, etc.) communicated to a remote navigation center and/or central control system (e.g., via network 160 or other similar distributed network). AGV 110 can comprise one or more data stores 130, sensors 140, and emitters 150 each in communication with one or more control circuits 120. In some embodiments, emitter 150 and sensor 140 are implemented together through a single device.

Further, the AGV 110 includes one or more propulsion systems (e.g., motors, wheels, tank treads, etc.) that enable the AGV to at least accelerate, deaccelerate, and/or traverse an environment using a navigation coordinate system, such as GPS, coordinate mapping information, beacon location information, cellular signal triangulation, other navigation systems and/or information, or a combination of two or more of such navigation systems and/or information. Further, the navigation coordinate system can be configured to provide location information, and in some instances time information. In some embodiments, the AGV 110 is configured to operate in different weather conditions, and/or can be readily modified depending on expected weather conditions (e.g., wheels replaced with tank treads when it is anticipated that the AGV 110 may encounter snow and/or ice). AGV 110 can, in some applications, be further configured to communicate with other AGVs, autonomous vehicles, transport vehicles, multiple different types of computing devices, a remote central control system, other computing devices, remote databases, and/or other such devices. The AGV 110 typically includes one or more wired and/or wireless transceivers enabling one or more different modes of communication (e.g., cellular, satellite, Wi-Fi, Ethernet, etc.).

Emitter 150 is configured to convey information, notifications, warnings and/or deterrents to a PoI, a worker, a potential threat (e.g., animal, person that is a potential threat), unknown third party, a remote central control system, a security service, a municipal police service, other such entities, or combination of two or more of such entities. In some applications, for example, the emitter 150 can comprise one or more output devices (e.g., speakers, displays, whistles, buzzers, lights and similar items) that convey text, audio, and/or visual signals. Emitter 150, in certain embodiments, can be configured to convey notifications having textual, audible and/or visual content. Similarly, the emitter 150 may additionally or alternatively be configured to facilitate wireless data communications with a computing device, including but not limited to, computing device 190. In certain embodiments, emitter 150 may be configured to transmit notifications to computing devices, such as computing device 190. In some embodiments, the emitter 150 may be configured to emit one or more irritants. For example, an "irritant" can include one or more stimuli or agents that can cause a person, animal, hostile third parties, or the like to not touch or tamper with the AGV 110 and/or to remove themselves from a predetermined perimeter about the AGV 110. Applicable irritants can include chemical, audible, visual irritants, or combination of two or more such irritants.

Chemical irritants can include substantially any relevant substance that can warn and/or deter unauthorized biological entities from approaching, getting too close, touching, interfering with, and/or damaging the AGV. In certain embodiments, applicable biological entities can comprise humans and other mammals, reptiles, birds, amphibians, fish, and invertebrates. For example, chemical irritants can include water, saline liquid, chemicals that temporarily mark hostile third parties upon contact therewith, chemicals that temporarily inflame mucus membranes of biological entities upon contact therewith, odious substances, pruritus inducing chemicals, other such chemicals, or combination of two or more such entities. For example, emitter 150 can comprise one or more reservoirs, pumps, nozzles, motors, compressed gas, etc. that can be used to eject and/or adjust the direction of emission of the irritant.

Additionally or alternatively, the output devices may include one or more speakers, whistles, buzzers, and the like that can be activated to generate one or more warnings (e.g., that may gradually increase in volume) audible irritants, and/or deterrent noises. Audible irritants can be substantially any relevant audible noise that can provide an alert, warn and/or deter interaction with the AGV. For example, audible irritants can include audible sounds within a frequency range of about 2 kHz to about 5 kHz, canine-specific audible sounds, sounds having a volume greater than one or more thresholds, audible alerts that can be understood by a person, and/or other such audible alerts and/or irritants. In some instances, one or more emitters 150 enable the AGV 110 to progressively escalate the deterrent effect of the deterrent and/or irritant.

For example, the AGV may initiate the generation of an audible alert when a human, animal, automobile, or the like is detected within a first threshold distance (which may depend on a speed at which the animal, person, automobile, etc. is approaching), increase the volume of the audible alert when within a second threshold distances (less than the first threshold distance), spray one or more streams of water when within a third threshold distance (less than the second distance), and spray prepper spray when within a fourth threshold distance for more than a threshold period of time and/or contacts the AGV.

The AGV 110 further typically includes multiple sensors 140. The sensors 140 can include substantially any relevant device that provides information to the AGV to be used in navigation, customer detection, potential threat detection, distance measurements, environment mapping, location determination, and/or other such sensor information. In some embodiments, the sensor includes one or more devices that can be used to capture data related to one or more objects located within a threshold distance relative to AGV 110. For example, one or more sensors 140 can be included and/or cooperated with the AGV that include, but are not limited to, one or more sensors to detect an object within one or more threshold or predetermined distances of the AGV, capture data within a threshold distance relative to AGV 110, detect movement, measure temperature, capture images and/or video, capture thermographic, infrared, and/or multispectral images, capture images of entities attempting to tamper with AGV 110, one or more accelerometers, one or more gyroscopes, one or more odometers, one or more location sensors, one or more microphones (e.g., which can be configured to capture audible authentication codes and/or voice prints, threatening language, verbal input from customers, verbal inquiries from customers, etc.), one or more distance measurement sensors (e.g., laser sensors, sonar sensors, sensors that measure distance by emitting and capturing a wireless signal (which can comprise light and/or sound) etc.), 3D scanning sensors, other such sensors, or a combination of two or more of such sensors. For example, one or more sensors 140 can be in communication with one or more access panels of AGV 110 and/or positioned adjacent to such access panels to sense when such panels are tampered with.

In some embodiments, one or more data stores 130 provide an information repository that typically stores programs 135 and files 137. The AGV 110 may, in some embodiments, further access one or more programs 135, files 137 and/or other relevant information external to AGV 110 and accessible via network 160. Files 137 can comprise information transmitted by app 170, data captured by the sensors 140, customer information, customer identifier information, computing device identifier information, product information, customer order information, navigation and/or routing information, location information, mapping information, AGV identifier information, communication procedures, threat information, sensor data, images, video, historic information, and/or other such information, and/or other such information. For example, in some embodiments, files 137 can further comprise one or more notification templates, which are software used by the AGVs 110 as a basis to convey salutations and/or advertisements to pedestrians and/or PoIs located within a threshold distance relative to the AGVs 110.

Notification template's content may at least be provided by product manufacturers, owners of the AGVs 110, and/or the PoIs. In some embodiments, notification templates may further be personalized using PoI specific information to, for example, target specific PoIs and increase engagement between PoIs and product manufacturers and/or the AGVs 110. Personalized notifications can reference customer history, current needs, anticipated needs, and/or similar information that can increase the probability that customers make desired product and/or service purchases. Commercial product information and/or PoI specific information may be added to notification templates in real-time prior to their transmission by the AGVs 110 when the presence of humans and/or PoIs are detected by control circuit 120. Commercial product information can include, for example, product names, product types, manufacturer names, manufacturer origin, ingredient names, ingredient types, component names, and/or component types. Notification templates can comprise audio and/or visual components, for example, music, speech, tones, images, and/or video.

Files 137 can further comprise personal and/or non-public information about PoIs, including but not limited to, information about browser history, location, birthdays, delivery dates, spouses, pets, and/or heirs associated with the PoI. Files 137 can comprise predetermined biometric data associated with one or more PoIs, which can be used for authentication purposes, and/or determining unknown and/or hostile third parties. Applicable biometric data can include, but is not limited to voice prints, iris-patterns, retina-patterns, hand geometries, earlobe geometries, facial landmarks, thermographic signatures, vascular patterns, skin texture data points, and/or walking gate data points. Predetermined biometric data can included data previously captured by the sensors 140, provided by the PoIs, external sensors, and/or received from an external central computing system.

As described above, the AGV 110 further includes programs 135 that are stored in the data store 130 and/or other memory, and utilized at least by the one or more control circuits 120. In some applications, one or more of the programs 135 are software that are executed by the one or more control circuits 120 to facilitate the operation, control, commercial activity, interaction with PoIs, deterring potential danger and the like of the AGV 110. For example, the one or more control circuits 120, in executing one or more programs 135, can use data generated by sensors 140 to detect when PoIs or hostile third parties are positioned within a threshold distance relative to the AGVs 110, generate notifications in response to detecting the presence of PoIs and/or humans, as well as generate notifications in response to receiving triggering events from APP 170. For example, the presence of PoIs positioned within threshold distances relative to AGVs 110 can be confirmed using geolocation data, which reflects the locations of PoIs, received from computing device 190, a central computing system, or other computing device comprising such information.

Hostile third parties can refer to any biological entity or autonomous vehicle attempting to interfere with the operation of AGV 110, which may, for example, be characterized as any attempts to gain unauthorized access to an internal area of the AGV 110, attempts to gain unauthorized access to the AGV 110 software and/or hardware, attempts to gain unauthorized access to products being transported by the AGV 110, attempt to damage the AGV 110, attempts to obstruct the travel path of AGV 110, and/or other activities that may be detrimental to the AGV 110, and/or interfere with the AGV 110.

Additionally or alternatively, control circuit 120, in executing one or more programs 135, can generate one or more types of biometric data (discussed above) using information captured via sensor 140, and determine whether the generated biometric data has one or more threshold relationships to predetermined biometric data included in files 137, wherein generated biometric data having threshold relationships identify PoIs and such data lacking the threshold relationships identify unknown and/or hostile third parties.

Figure 2:
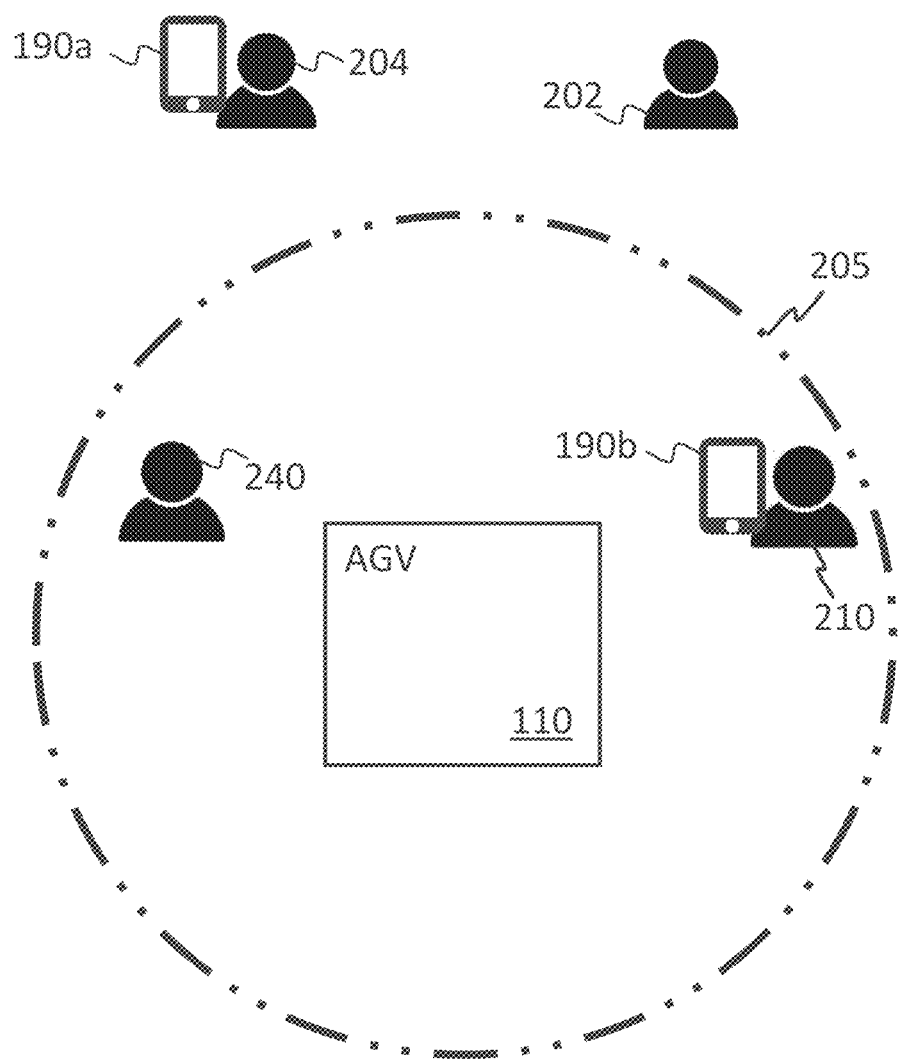
FIG. 2 depicts an exemplary environment for enabling communication with PoIs via AGVs, in accordance with several embodiments.

FIG. 2 depicts an exemplary environment for enabling communication with PoIs via AGVs, in accordance with several embodiments. AGV 110 traverses environment 200 to engage in delivering one or more commercial products, picking one or more commercial products up for return, retrieving one or more commercial products to subsequently be delivered to a location or customer, obtaining video content, obtaining one or samples through the application of one or more sensors, performing one or more commercial activities, perform one or more other relevant tasks, or combination of two or more tasks. Perimeter 205, for example, is the distance within which AGV 110 is programed to communicate with PoIs and/or pedestrians. As discussed above, the safety and/or normal operation of the AGVs 110 typically necessitates the need for the AGVs 110 to have situational awareness of its immediate environment. Perimeter 205, for example, may reflect the radius at which the AGVs 110 can identify potential hostile third parties and take one or more evasive actions in response thereof, the radius at which the AGVs 110 can initiate communication with customers within a psychologically beneficial period of time and thereby contribute to the resultant customer experience, a radius that reflects the extent of the operational range of the one or more sensors 140, a radius that compensates for AGV 110 velocity and supports normal AGV operation (for example, data generation by sensors 140 and subsequent processing thereof) at velocities, or a combination of two or more of the aforementioned tasks. In certain embodiments, perimeter 205 can be set by a central control circuit, AGV 110, the notification template requirements, or any combination of two or more thereof.

Here, PoI 204 and PoI 210 are depicted as persons in possession of computing devices 190*a*, 190*b*, respectively, pictured here as mobile computing devices. Pedestrians 202 and 240 are further depicted without computing devices. Computing devices 190*a*, 190*b* each comprise apps 170*a*, 170*b* (not shown), respectively. PoIs may be detected via positional information. For example, apps 170*a*, 170*b* may each transmit the positional coordinates of computing device 190*a*, 190*b*, respectively, to AGV via network 160. The one or more control circuits 120, executing one or more programs 135, can compare the transmitted positional data to the positional coordinates of AGV 110 to determine that the received positional coordinates for computing device 190*a* are located beyond perimeter 205 and those for device 190*b* are located within perimeter. As such, control circuit 120 can cause emitter 150 to transmit a notification to PoI 210 only.

PoIs can be detected using unique identification codes. For example, control circuit 120, executing one or more programs 135, can receive a unique identification code from computing device 190*b* and compare the received code to a list of predetermined identification codes associated with one or more PoIs include in files 137 to ascertain the presence of PoI 210, and generate one or more personalized notifications, as discussed above, and transmit the one or more generated personalized notifications to computing device 190*b* to cause information included in the generated notifications to be provided to PoI 210. Control circuit 120 typically disregards computing device 190*a*, which is positioned beyond perimeter 205.

The presence of pedestrians and PoIs can be detected using captured images. As discussed above, pedestrians are humans that AGV 110 cannot identify and PoIs are humans that AGV 110 can identify. The one or more control circuits 120 can, for example, cause one or more sensors 140 to capture one or more images of the environment within perimeter 205, detect within the one or more captured images the presence of objects having a threshold relationship to one or more predefined biometric parameters included in files 137 defining PoI 210 and an unidentified human (pedestrian 240). The one or more control circuits 120, executing one or more programs 135, can cause emitter 150 to emit one or more non-personalized audible notifications to the unidentified human, as well as one or more personalized and/or non-personalized audible and/or wireless notifications to PoI 210. For example, "Happy Friday, PoI 210!" or "Your preferred toothpaste, product 123, is on sale this week for $3.50 at vendor 123."

Figure 3:
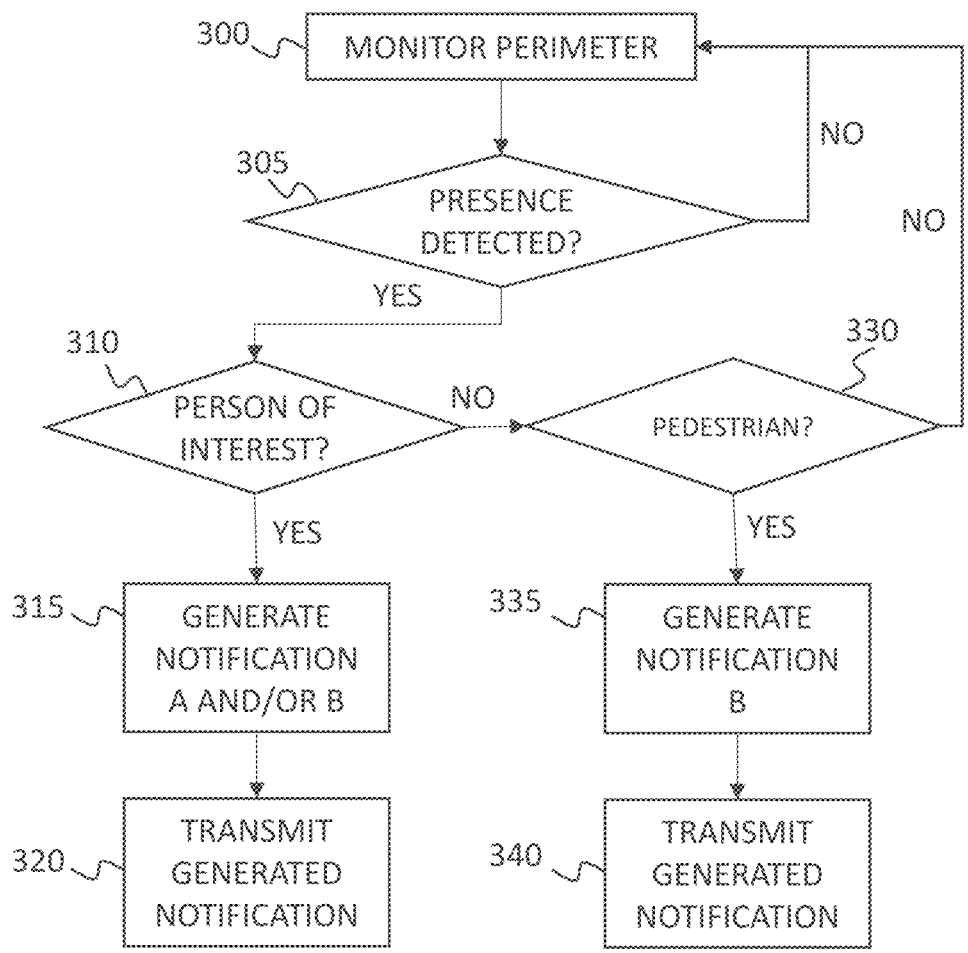
FIG. 3 is a flowchart of an exemplary process of enabling communication with PoIs via AGVs, in accordance with some embodiments.

FIG. 3 is a flowchart of an exemplary process of enabling communication with PoIs via AGVs 110, in accordance with some embodiments. Program 135 monitors the presence of objects within a predetermined perimeter relative to AGV 110 (step 300). If program 135 does not detect the presence of an object ("no" branch decisional 305), program 135 returns to step 300. If program 135 detects the presence of an object ("yes" branch decisional 305), program 135 proceeds to decisional 310. If program 135 determines that the detected object is not a PoI ("no" branch decisional 310), program 135 proceeds to decisional 330.

If program 135 determines that the detected object is a PoI ("yes" branch decisional 310), program 135 generates notification A and/or notification B (step 315) and proceeds to step 320. Notification A can be a personalized notification. Notification B can be a generic notification. Program 135 transmits generated notification (step 320). If program 135 determines that the detected object is not a pedestrian ("no" branch decisional 330), program 135 proceeds to step 300. If program 135 determines that the detected object is a pedestrian ("yes" branch decisional 330), program 135 generates notification B (step 335) and proceeds to step 340. Program 135 transmits the generated notification (step 340).

Figure 4:
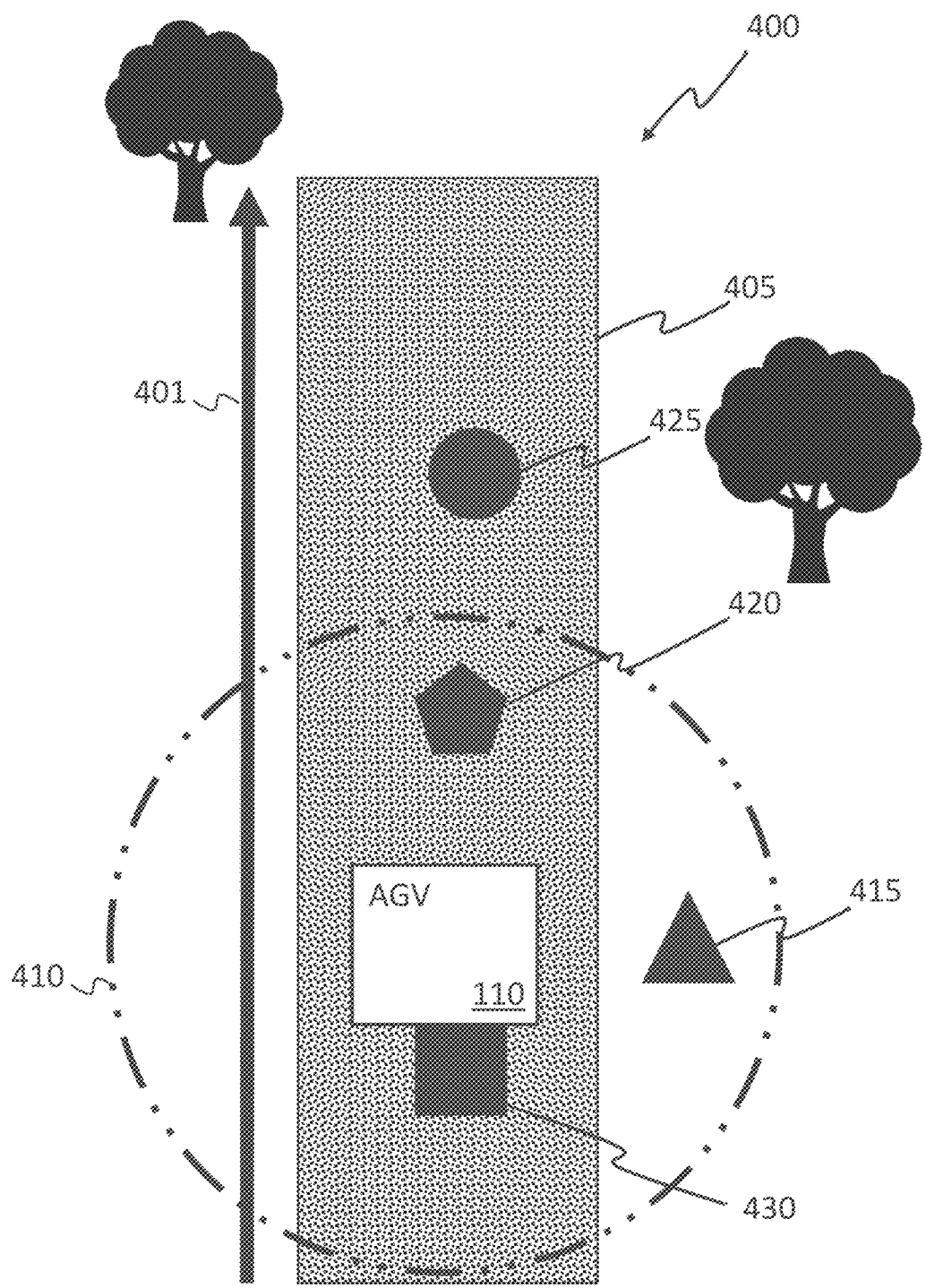
FIG. 4 illustrates an exemplary environment for enabling delivery of commercial products, in accordance with some embodiments.

FIG. 4 illustrates an exemplary environment for enabling delivery of commercial products, in accordance with some embodiments. For example, AGV 110 traverses path 405 with a bearing depicted by attitude 401. Path 405 represents a portion of a commercial route generated or received by AGV 110 to engage in one or more aforementioned tasks. The one or more control circuits 120 can cause one or more sensors 140 to capture one or more images of objects positioned within parameter 410, and processes the one or more images to determine whether hostile third parties are present within parameter 410, as discussed above. In certain embodiments, the radius of perimeter 410 may be greater than the radius of perimeter 205 to identify potential threats at greater distances relative to AGV 110 than required for identifying PoIs.

Control circuit 120, executing one or more programs 135, can use the one or more captured images to detect the presence of objects 415, 420, and 430 and their associated positions using any of the aforementioned methods. Objects determined to be positioned along path 405 and within perimeter 410 (e.g., objects 420 and 430) typically undergo further analysis due to their potential to interfere with AGV 110 progression along path 405 and/or interfere with one or more of the aforementioned tasks and/or operations of AGV 110.

In some embodiments, the control circuit 120, based on sensor data received from one or more sensors 140, may determine that object 430 is attempting to gain entry to one or more access panels of AGV 110 or otherwise trying to tamper with the AGV 110, and in response to receiving such data, instruct one or more emitters 150 to emit one or more irritants in the general direction of object 430. Control circuit 120 can further use sensor 140 data to identify a general direction of the object 430 relative to the AGV and instruct emitter 150 to direct and/or aim toward the determined direction of the potential threat object 430 prior or subsequent to activating the emitter system.

Further, in some embodiments, the control circuit 120, executing one or more program 135, may evaluate sensor 140 data (e.g., the captured images, distance measurements, heat sensing data, etc.), determine (using an aforementioned process) that object 420 is a biological entity that is obstructing the path of AGV 110, and in response to the determination, cause emitter 150 to emit one or more irritants in the general direction of object 420. Subsequently, control circuit 120, executing one or more programs 135, can analyze updated images of perimeter 410 and determine that path 405 is no longer obstructed, and cause AGV 110 to proceed along path 405. Alternatively, if control circuit 120 determines that object 420 is an inanimate object, control circuit 120 may determine an alternative travel route that bypasses the obstruction, notify a central control system of the obstruction, and/or request an alternative route that bypasses the obstruction from a central control system.

Figure 5:
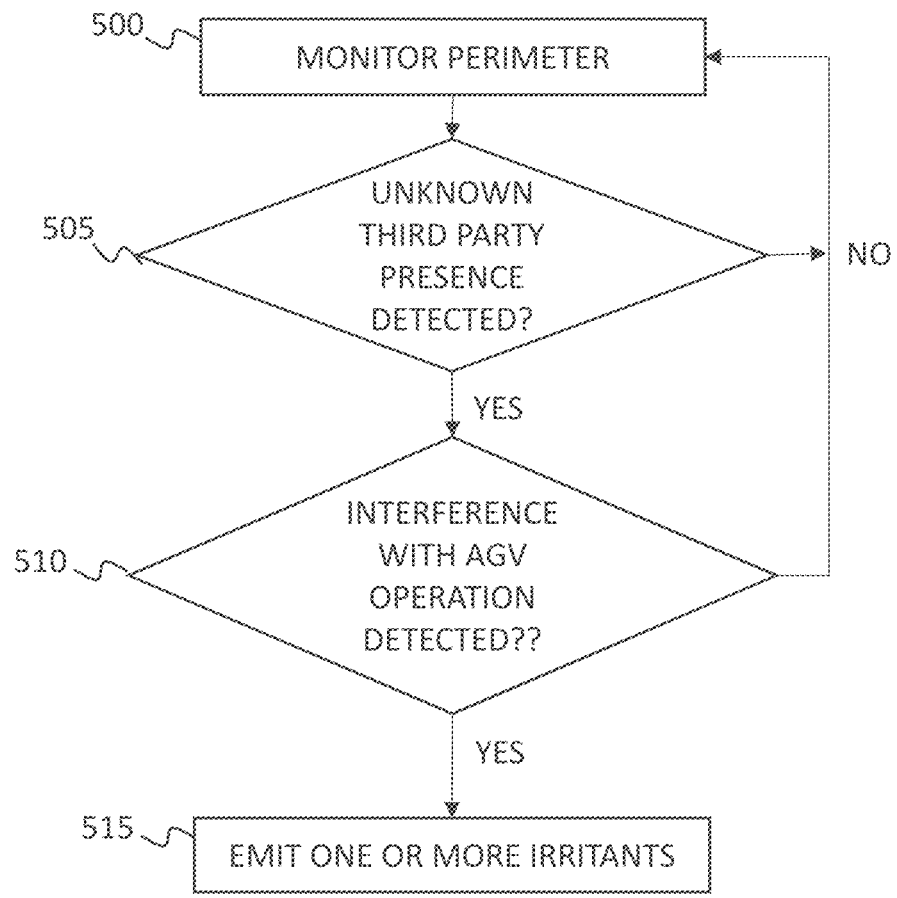
FIG. 5 is a flowchart of an exemplary process of enabling delivery of commercial products, in accordance with some embodiments.

FIG. 5 is a flowchart of an exemplary process of enabling delivery of commercial products via an AGV, in accordance with some embodiments. Program 135 monitors the perimeter 410 (step 500). If program 135 does not detect the presence of an unknown third party ("no" branch decisional 505), program 135 returns to step 500. If program 135 detects the presence of an unknown third party ("yes" branch decisional 505), program 135 determines whether the unknown third party is interfering with the operation of AGV 110 (decisional 510). If program 135 determines that the unknown third party is not interfering with the operation of AGV 110 ("no" branch decisional 510), program 135 returns to step 500. If program 135 determines that the unknown third party is interfering with the operation of AGV 110 ("yes" branch decisional 510), program 135 emits one or more irritants (step 515).

Figure 6:
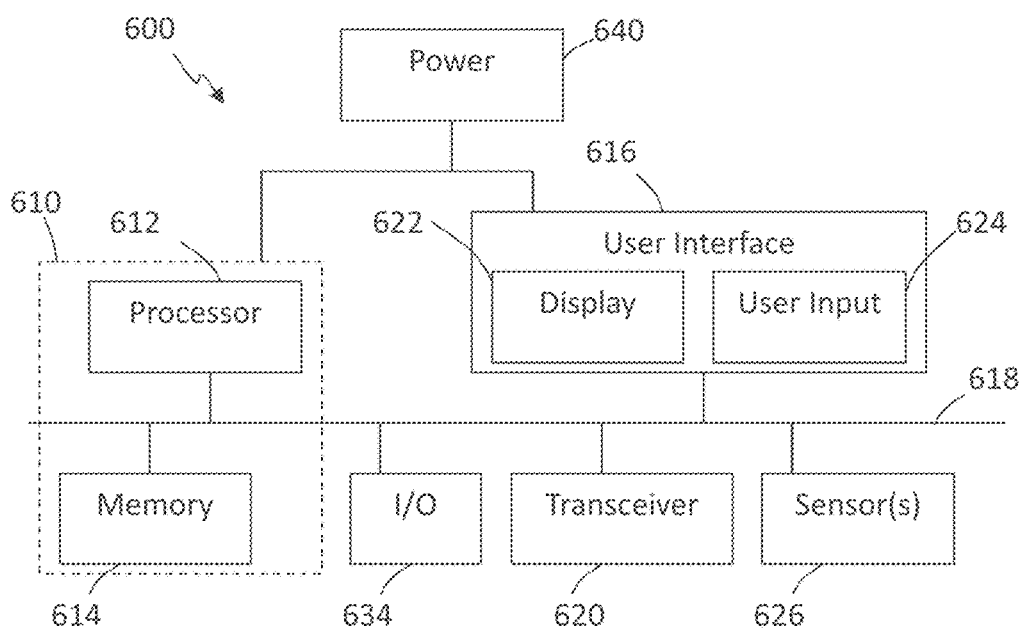
FIG. 6 illustrates an exemplary system for use in implementing methods, techniques, devices, apparatuses, systems, servers, sources and enabling the communication with PoIs and enabling delivering commercial products, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of the AGV 110, the control circuit 120 of the AGV, the computing device 190, and/or other above or below mentioned systems or devices, or parts of such circuits, circuitry, functionality, systems, apparatuses, processes, or devices. For example, the system 600 may be used to implement some or all of the AGV, the AGV control circuit 120, one or more other control circuits and/or processing systems of the AGV (e.g., video processing systems, image processing systems, sensor data processing systems, emitter system, and the like), one or more control and/or processing systems of the computing device 190, one or more remote central control systems, and/or other such components, circuitry, functionality and/or devices. However, the use of the system 600 or any portion thereof is certainly not required.

By way of example, the system 600 may comprise a control circuit or processor module 612, memory 614, and one or more communication links, paths, buses or the like 618. Some embodiments may include one or more user interfaces 616, and/or one or more internal and/or external power sources or supplies 640. The control circuit 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry and/or a control system 610, which may be implemented through one or more processors with access to one or more memory 614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network 160 (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) ports 634 that allow one or more devices to couple with the system 600. The I/O ports can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 626 to provide information to the system and/or sensor information that is communicated to another component, such as the central control system, a delivery vehicle, etc. The sensors can include substantially any relevant sensor, such as distance measurement sensors (e.g., optical units, sound/ultrasound units, etc.), cameras, motion sensors, inertial sensors, accelerometers, impact sensors, pressure sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor readable and/or computer readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 160. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

In some embodiments, autonomous product delivery systems are provided to enable communication with a PoI during product delivery, comprises: an AGV on a product delivery route and configured to transport one or more retail products to a delivery location(s) to at least one recipient via the product delivery route. The AGV includes one or more sensors in electrical communication with one or more control circuits and configured to communicate sensor data to the one or more control circuits, and one or more emitters in electrical communication with the one or more control circuits. The control circuits use sensor data to detect the presence of one or more PoIs when such PoIs are positioned within a threshold distance relative to the AGV, and in response to the detection, cause the emitters to transmit a personalized message to the PoIs. The sensor data includes at least one of geolocation data received from at least one mobile computing device associated with the POI and at least one data transmission received from the at least one mobile computing devices associated with the POI. The POI is not a recipient.

Some embodiments, methods are provided for enabling communications with a PoI via an autonomous delivery system, comprises: detecting, through an AGV on a product delivery route, the presence of one or more PoIs positioned within a threshold distance relative to the AGV on the product delivery route; and transmitting, from the AGV, one or more personalized messages to the PoI that include information associated with the PoIs. The AGV configured to transport at least one retail product to at least one delivery location to one or more recipients located at the at least one delivery location via the product delivery route. The step of detecting the presence of the POI utilizes sensor data comprising at least one of geolocation data received from at least one mobile computing device associated with the POI and a data transmission(s) received from the at least one mobile computing device associated with the POI.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An autonomous product delivery system to communicate with a person during product delivery, comprising:
   an autonomous ground vehicle ("AGV") on a product delivery route, configured to transport a retail product to a delivery location to a recipient via the product delivery route, comprising:
      a control circuit;
      a sensor in electrical communication with the control circuit and configured to communicate sensor data to the control circuit; and
      an emitter in electrical communication with the control circuit;
   wherein the control circuit is configured to:
      detect, based on sensor data, the presence of the person when the person is positioned within a threshold distance relative to the AGV on the product delivery route, wherein the person is not the recipient;
      determine, based on occurrence of a communication from a mobile computing device, whether the person is a person of interest (PoI) or a pedestrian; and
      if the communication is received from the mobile computing device,
         determine that the person is a PoI, and
         cause the emitter to transmit a personalized message to the PoI; and
      if the communication is not received from the mobile computing device,
         determine that the person is a pedestrian, and
         cause the emitter to emit a non-personalized audible notification.

2. The system of claim 1, wherein the sensor is configured to perform an action on objects positioned with the threshold distance, wherein the action is selected from a group consisting of capture an image, measure a distance, and measure a temperature.

3. The system of claim 1, wherein the non-personalized audible notification is a greeting.

4. The system of claim 1, wherein the control circuit is further configured to utilize a data transmission received from the mobile computing device to identify the PoI.

5. The system of claim 1, wherein in causing the emitter to transmit the personalized message the control circuit is further configured to cause the emitter to transmit the personalized message when the control circuit receives a triggering event via a mobile application loaded on the mobile computing device associated with the PoI.

6. The system of claim 1, wherein the personalized message comprises personalized information associated with the PoI, and wherein the personalized information is selected from the group consisting of a birthday, a delivery date, a spouse, a pet, and an heir.

7. The system of claim 1, wherein the emitter is configured to transmit the personalized message to the mobile device associated with the PoI for conveyance thereon.

8. The system of claim 1, wherein the emitter is configured to transmit the personalized message via an audible output.

9. The system of claim 1, wherein the personalized message comprises at least one of a salutation and an advertisement.

10. The system of claim 1, wherein in detecting the presence of the person the control circuit is further configured to utilize geolocation data received from the mobile computing device associated with the person to confirm the person is positioned within the threshold distance relative to the AGV.

11. A method of communicating with a person via an autonomous product delivery system during product delivery, comprising:
  detecting, through an autonomous ground vehicle (AGV) on a product delivery route, the presence of the person positioned within a threshold distance relative to the AGV on the product delivery route, the AGV configured to transport a retail product to a delivery location to a recipient via the product delivery route; and
  determining, based on occurrence of a communication from a computing device, whether the person is a person of interest (PoI) or a pedestrian; and
  if the communication is received from the mobile computing device, determining that the person is a PoI, and causing the emitter to transmit a personalized message to the PoI; and
  if the communication is not received from the mobile computing device, determining that the person is a pedestrian, and
    causing the emitter to emit a non-personalized audible notification,
  wherein the step of detecting the presence of the person is based on sensor data.

12. The method of claim 11, wherein the step of detecting the presence of the person comprises processing a captured image and detecting an object that has a threshold relationship to predefined parameters defining the person.

13. The method of claim 11, wherein the step of transmitting the personalized message comprises retrieving the information from an external non-public data source.

14. The method of claim 11, wherein the step of detecting the presence of the person comprises receiving a unique identification code from a mobile computing device associated with the person.

15. The method of claim 11, wherein the personalized message includes information selected from the group consisting of a birthday, a delivery date, spousal information, pet information, and information concerning an heir.

16. The method of claim 11, wherein the step of transmitting the personalized message comprises transmitting a wireless signal configured to only be detected by a mobile computing device associated the PoI.

17. The method of claim 11, wherein the step of transmitting the personalized message comprises wirelessly transmitting the message to the mobile device associated with the PoI.

18. The method of claim 11, wherein the step of transmitting the personalized message comprises generating an audible output from a speaker located on the AGV.

19. The method of claim 11, wherein the personalized message comprises at least one of a salutation and an advertisement.

20. The method of claim 11, wherein the step of detecting the presence of the person comprises determining when the person is positioned within the threshold distance using geolocation data that reflects a location of the person, wherein the geolocation data is received from the mobile computing device associated with the PoI.

* * * * *